United States Patent
Wiley

[11] 3,841,842
[45] Oct. 15, 1974

[54] CATALYTIC CONVERTER
[75] Inventor: Robert F. Wiley, Corning, N.Y.
[73] Assignee: Corning Glass Works, Corning, N.Y.
[22] Filed: Dec. 11, 1972
[21] Appl. No.: 313,764

[52] U.S. Cl. ............................ 23/288 F, 23/288 R
[51] Int. Cl. ......................... F01n 3/14, B01j 9/04
[58] Field of Search ......... 23/288 F, 288 R; 60/299

[56] References Cited
UNITED STATES PATENTS

| | | | |
|---|---|---|---|
| 1,789,812 | 1/1931 | Frazer | 23/288 F UX |
| 3,065,595 | 11/1962 | Gary | 23/288 F UX |
| 3,248,188 | 4/1966 | Chute | 23/288 F UX |
| 3,428,434 | 2/1969 | Hurko | 23/288 F |
| 3,441,381 | 4/1969 | Keith et al. | 23/288 F |
| 3,441,382 | 4/1969 | Keith et al. | 23/288 F |
| 3,597,165 | 8/1971 | Keith et al. | 23/288 F |
| 3,598,543 | 10/1971 | Crosby et al. | 23/288 F |
| 3,692,497 | 9/1972 | Keith et al. | 23/288 F |
| 3,768,982 | 10/1973 | Kitzner et al. | 23/288 F |
| 3,770,389 | 10/1973 | Kitzner et al. | 23/288 F |

*Primary Examiner*—Barry S. Richman
*Attorney, Agent, or Firm*—Charles W. Gregg; Clarence R. Patty, Jr.

[57] ABSTRACT

A catalytic converter to be used in exhaust systems of internal combustion engines for emission control purposes. The converter comprises an assembly including a cylindrical metal housing or casing joined to a pair of oppositely disposed generally frusto-conical or funnel shaped metal housings or casings, such housings or casings forming a container surrounding a cylindrical honeycomb core member of a material having high temperature durability and a low coefficient of thermal expansion, such as a refractory ceramic material. The container is designed to include mounting means for said core member to compensate for the differences in thermal expansion of the material of the core member and the metal material of the assembly of the housings or casings of the container.

9 Claims, 4 Drawing Figures

PATENTED OCT 15 1974　　　　　　　　　　　　　　　　3,841,842

CATALYTIC CONVERTER

BACKGROUND OF THE INVENTION

It has long been known that the exhaust gases from internal combustion engines of automobiles and similar types of vehicles are pollution sources which are largely responsible for air pollution problems in cities and other densely populated areas and, therefore, so-called emission control of such exhaust gases is being intensively and extensively pursued in order to reduce, to the extent possible, air pollution from said sources. Catalytic converters in the exhaust systems of automotive vehicles having internal combustion engines are extremely helpful in reducing air pollution from such sources but, insofar as is known, a completely acceptable and economical catalytic converter has not heretofore been developed.

While refractory ceramic core members for catalytic converters have been developed to the point where they perform substantially satisfactorily, such core members embody a honeycomb of very small passages or channels with relatively thin walls and the ceramic material of the core members is a relatively brittle material. For this reason the core members must be mounted in their casings or containers so that they are always securely held and do not become loose at any time so as to shake about in the casings or containers and thereby become broken up, cracked, chipped or otherwise fractured. Differences in the coefficients of thermal expansion of the ceramic materials of the core members and the metal materials of the containers or casings for such members impose the problem of mounting the core members within the containers or casings in a manner to compensate for said differences in expansion and thereby prevent said fracturing, chipping or breaking up of the core members by intolerable shaking about in their casings or containers. Containers or casings that have been heretofore developed for the purposes of solving said problem have heretofore been either relatively elaborate or complex and, therefore, uneconomical, or have not been sufficiently durable for the satisfactory solution of the fracturing problem. The present invention was, therefore, developed to provide catalytic converters of the type mentioned including relatively economical and generally otherwise satisfactory and relatively durable casings or containers for the core members of the catalytic converters.

SUMMARY OF THE INVENTION

A brief summary of the invention is believed to be sufficiently contained in the foregoing abstract of the disclosure and, therefore, for the purposes of brevity and to prevent redundancy, no further brief summary of the invention will be given nor is considered necessary.

BRIEF DESCRIPTION OF THE DRAWINGS

In the drawings.

Similar reference characters refer to similar parts in each of the Figs. of the drawings.

PREFERRED EMBODIMENTS OF THE INVENTION

Figure 1:
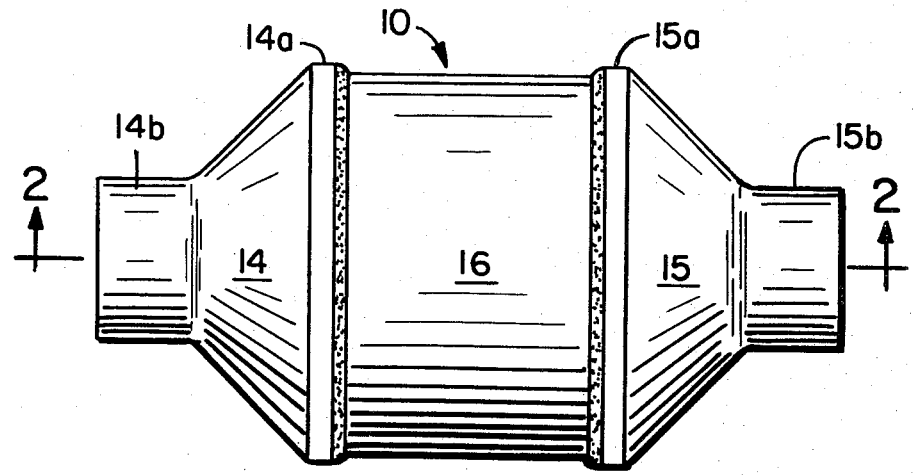
FIG. 1 is an elevational side view of one form of catalytic converter embodying the invention.
Figure 2:
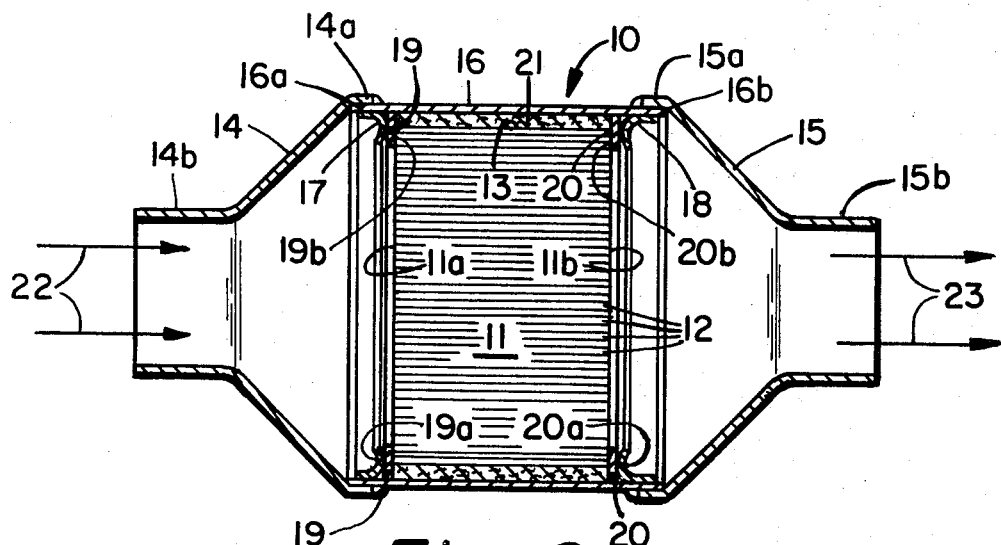
FIG. 2 is a cross-sectional view of the converter of FIG. 1, such view being taken generally along line 2—2 of FIG. 1.

Referring to the drawings in detail, there is shown in FIGS. 1 and 2 a catalytic converter 10 comprising a cylindrical honeycomb body or core member 11 of a refractory ceramic material having a myriad of relatively minute passages such as 12 extending therethrough from one planar end of the core member or honeycomb body to the other. The outer periphery of member 11 is preferably provided with a substantially hermetic band 13 which may, for example, be of the same refractory ceramic material as the core member 11 itself. Cylindrical honeycomb bodies or core members such as 11 are now well known in the art and such a member may, for example, be made by the method disclosed in U.S. Pat. No. 3,246,972, issued Apr. 19, 1966 to Gail P. Smith, and reference is made to lines 52 through 75 of column 4 and lines 1 through 73 of column 5 of such patent if a specific example of one method of making the honeycomb body 11 is desired. Reference is also made to U.S. Pat. No. 3,441,381, issued on Apr. 29, 1969 to C. D. Keith et al. Such Keith et al. patent discloses a catalytic converter similar to that disclosed herein but the converter of the present invention embodies novel features not disclosed in said patent and which will be hereinafter discussed. Following the making of a honeycomb body or core member such as 11, if the converter is to be used as catalytic oxidation converter, the walls of the passages such as 12 extending through the body or core member have, for example, an oxidation catalyst deposited thereon, such catalysts and methods of deposition thereof being well known in the art. In this connection reference is again made to U.S. Pat. No. 3,441,381 mentioned above.

Referring further to FIG. 2, there is provided first and second generally funnel shaped and identical metallic casings 14 and 15, respectively, each having a cylindrical large open end rim portion of a diameter slightly greater than the diameter of core member 11, such rim portions being designated 14a and 15a, respectively. Casings 14 and 15 are preferably made of a stainless steel material in order to provide relatively smooth surfaces for the casings, and because of the relatively high oxidation resistance properties and relatively low coefficient of thermal expansion of such a metallic material. The large open end rim portions 14a and 15a of casings 14 and 15 taper to smaller diameter cylindrical end portions 14b and 15b respectively, which form inlet and outlet conduits for exhaust gases as further discussed hereinafter.

An open end cylindrical housing or casing 16 is provided, such housing or casing having a cross-sectional shape geometrically similar to the rim portions 14a and 15a of the large open ends of housings or casings 14 and 15 and an outer diameter corresponding to the inner diameters of said rim portions so that the ends 16a and 16b of casing 16 can fit snugly within such rim portions 14a and 15a as best illustrated in FIG. 2.

Figure 3:
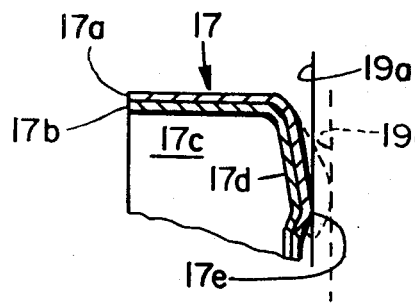
FIG. 3 is an enlarged sectional view of a small part of a member of the catalytic converter embodying the invention, such view illustrating a detail of the converter.
Figure 4:
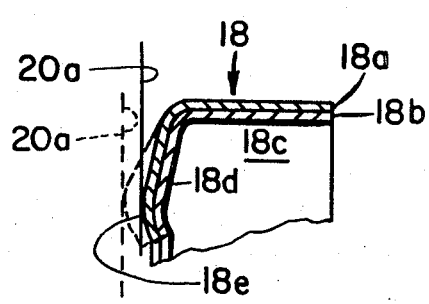
FIG. 4 is a view similar to FIG. 3 but illustrating another small part of a member of the catalytic converter of the invention.

There is welded to the inner surface of housing or casing 16, adjacent ends 16a and 16b of such casing, a pair of laminated bimetal dish-like annuluses such as 17 and 18, respectively, each of which comprises a pair of joined metal parts 17a and 17b (FIG. 3) and 18a and 18b (FIG. 4) having substantially dissimilar temperature coefficients of thermal expansion. Each annulus includes cylindrical portions 17c and 18c, which are welded to casing 16 as mentioned above, and convex portions 17d and 18d which slope or extend radially inwardly towards the centers of the annuluses preferably at an angle somewhat greater than ninety degrees as illustrated in FIGS. 2 and 3. The inner rims of said portions 17d and 18d are bent to form curved bearing surfaces 17e and 18e, respectively, which, as best shown in FIGS. 3 and 4, bear against outer surfaces 19a and 20a, respectively, of a pair of flat rings or large washers 19 and 20, respectively, as hereinafter further discussed. Rings or washers 19 and 20 have outer peripheries which correspond to or are geometrically congruent with the inner perimetric surface or circumference of casing or housing 16. Annuluses 17 and 18 will be further discussed hereinafter.

In assembling converter 10, annulus 17 is welded to the inner surface of casing 16, adjacent end 16a thereof as previously mentioned, and end 14a of casing 14 is then slid over end 16a of casing 16 and welded thereto as illustrated in FIGS. 1 and 2. Ring or washer 19 is then inserted or slid in casing 16 until surface 19a of such ring or washer is in contact with bearing surface 17e (FIG. 3) of annulus 17. Core member of body 11 is then inserted in casing 16 until an outer annular portion of an end 11a of the core member contacts the inner surface 19b of ring or washer 19. A resilient compressible thermal resistant material 21, such as a stainless steel wire mesh for example, is evenly provided in a partly compressed condition about the outer periphery of core member or body 11 so as to substantially center such member or body within the hollow of casing 16. This will be further discussed hereinafter in an operational example of the invention.

Following the above steps, ring or washer 20 is inserted or slid into casing or housing 16 until the inner surface 20b thereof contacts an outer annular portion of end 11b of the core member or body 11. Annulus 18 is then inserted within end 16b of container 16 until bearing surface 18e (FIG. 4) contacts outer surface 20a of ring or washer 20. Additional force is then applied to annulus 18 to push washer 20 against the contacted portion of end 11b of core member 11 and subject such core member to a compressional force at least in an outer annular region of the core member. Annulus 18 is then welded to the inner surface of casing 16, adjacent end 16b thereof as previously mentioned, to maintain said compressional force. End 15a of casing 15 is then slid over end 16b of casing 16 and welded thereto as illustrated in FIGS. 1 and 2 of the drawings. The converter is thus completed. It is pointed out, however, that rings or washers 19 and 20 are slidably movable within casing 16 in the axial direction of such casing. In addition, and as will be readily apparent to those skilled in the art, the converter could obviously be assembled in a manner opposite to that just described. Furthermore, the resilient thermal resistant and compressible material, such as 21, could be partly compressed and then wrapped around the outer periphery of core member or body 11 prior to the above-discussed insertion of such member or body into the hollow of casing 16.

Returning to the bimetal annuluses 17 and 18, such annuluses each comprise a pair of parts 17a and 17b (FIG. 3) and 18a and 18b (FIG. 4) of different temperature coefficients of thermal expansion as previously mentioned. For example, part 17a may be made of No. 430 stainless steel having a temperature coefficient of thermal expansion of $6 \times 10^{116\ 6}$ per degree F while part 17b may be made of No. 304 stainless steel having a temperature coefficient of thermal expansion of $11 \times 10^{-6}$ per degree F. The inner diameter of casing 16 may, for example, have a diameter of 5.25 inches and may also be made of No. 430 stainless steel while casings 14 and 15 as well as rings or washers 19 and 20 may be made of the above mentioned No. 304 stainless steel. The temperature coefficient of thermal expansion of core member or body 11 is, for example, on the order of $12.5 \times 10^{-7}$ per degree F. It should be here pointed out, however, that the values mentioned are given as examples only and are not to be considered at all critical since many variations can be made in said values as will be readily apparent to those skilled in the art.

In use, the catalytic converter of the invention is connected to the exhaust system of an internal combustion engine so that the exhaust gases or emissions from such engine flow, for example, into gas inlet conduit 14b (small end of casing 14) through the core member or honeycomb body 11 of the converter in the right hand direction, as indicated by arrows such as 22 in FIG. 2, and thence out of the converter through gas outlet conduit 15b (small end of casing 15) as indicated by arrows such as 23. However, as is believed obvious, the catalytic converter could be connected to an exhaust system so that the exhaust gases flow through the converter in the direction opposite to that mentioned above, and conduits 15b and 14b then become the inlet and outlet conduits, respectively.

When the catalytic converter is connected to an exhaust system of an engine as mentioned and such engine is operating, the exhaust gases flow through core member or honeycomb body 11 and the temperature of such member is raised to about 1,500°F under steady operating conditions and may at times reach a temperature of about 1,600°F. At such times casings 14 and 15 attain a temperature of about 1,100°F. while casing 16 may reach a temperature of about 590° to 600°F. As core member 11 increases in temperature from the heat of exhaust gases it expands radially and linearly. However, as casing 16 similarly increases in temperature it expands linearly and radially to an extent substantially greater than core member 11. At such time the compressed resilient material such as 21 surrounding core member 11 expands to allow for such difference in radial expansion and, thereby, hold core member 16 generally centered within the hollow of casing 16.

Under the above conditions, since bimetal annuluses 17 and 18 are welded to casing 16, they are moved in left and right hand directions, respectively (viewing FIG. 2) along with the linear expansion of casing 16 and would, therefore, tend to move their previously mentioned bearing surfaces or points 17e and 18e from in contact with surfaces 19a and 20a of rings or washers 10 and 20, respectively. However, the bimetal construction of annuluses 17 and 18, which also increase in temperature along with casing 16, causes the high temperature coefficient of thermal expansion parts 17b and 18b of annuluses 17 and 18 to expand to a greater extent than the low coefficient parts 17a and 18a of said annuluses, and portions 17d and 18d of the annuluses therefore move, as indicated by the curved broken lines in FIGS. 3 and 4, to maintain said contacting surfaces or points 17e and 18e of annuluses 17 and 18, respectively, in firm compressive contact with surfaces 19a and 20a of rings 19 and 20, as indicated by the straight broken lines in FIGS. 3 and 4. This, in turn, maintains surfaces 19b and 20b of said rings in firm compressive contact with the aforesaid outer annular portions of ends 11a and 11b of core member 11 since rings or washers 19 and 20 are not attached to anything and are, therefore, free to move within casing 16. Thus, as the converter 10 is subjected to various heat conditions by exhaust gases flowing therethrough (or lack of flow of such gases) the compressible resilient stainless steel wire mesh, such as 21, or similar compressible material provided in the space surrounding core member 11 between the periphery of such member and the inner surface of casing 16, somewhat constrains the radial expansion of core member 11 while maintaining such core member centered within casing 16. Similarly, the bimetal annuluses 17 and 18, maintain an axial compressive force on rings or washers 19 and 20 and, thereby, on at least a part of core member 11 as mentioned above.

It is pointed out that both of said annuluses 17 and 18 need not necessarily be a laminated bimetallic structure but that only one of such annuluses could be such a structure while the other annulus is a resilient annulus of a single thickness of a metallic material. Under such conditions the single bimetallic annulus would be intended to compensate for the differences in thermal expansions between the material of core member 11 and the material of the casings to the converter as will be readily apparent from the foregoing operational example.

Although there is herein shown and described in detail only one form of a catalytic converter embodying the invention, it will be understood that various changes and modifications may be made therein within the purview of the appended claims without departing from the spirit and scope thereof.

What is claimed is:

1. A catalytic converter comprising in combination; a cylindrical core member of a refractory ceramic material, a cylindrical metallic casing surrounding the outer periphery of said core member and greater in length than such member with an annular space provided between the inner peripheral surface of the casing and said outer periphery of the core member, and first and second oppositely disposed and generally funnel shaped metallic casings, such casings having large open ends attached to the ends of said cylindrical casing and smaller open ends forming inlet and outlet conduits for the exhaust gases from an internal combustion engine; means for supporting said core member within said cylindrical casing to compensate for differences in thermal expansion of the core member and said casings when exhaust gases flow from an internal combustion engine through the converter from said inlet conduit to said outlet conduit, said means comprising;

A. a pair of first and second flat metallic rings corresponding in outer periphery to said inner peripheral surface of said cylindrical casing and snugly and slidably disposed in first and second ends thereof with a first flat surface of said first and second rings in contact with outer annular portions of first and second ends, respectively, of said core member;

B. a pair of first and second bimetal annuluses each comprising a pair of joined inner and outer metal parts having substantially dissimilar temperature coefficients of thermal expansion and each annulus including a cylindrical portion fixedly attached to the inner surface of said cylindrical casing adjacent first and second ends thereof, respectively, and portions which extend radially inwardly towards the centers of each respective annulus to firmly contact the second surface of said flat ring in the respectively associated end of the cylindrical casing, said metal part which is said outer metal part of each said annulus having a lower temperature coefficient of thermal expansion than said metal part which is said inner metal part of each said annulus.

2. A catalytic converter in accordance with claim 1 and in which said annular space provided between said cylindrical casing and said core member is filled with a high temperature resistant, resilient and partly compressed material.

3. A catalytic converter in accordance with claim 2 and in which said partly compressed material comprises a stainless steel wire mesh.

4. A catalytic converter comprising, in combination;

A. a cylindrical core member of a refractory ceramic material having a myriad of passages extending therethrough from one planar end thereof to the other;

B. a cylindrical casing somewhat longer than said core member and surrounding said member with an annular space remaining between the outer periphery of said member and the inner surface of said casing;

C. first and second oppositely disposed and generally funnel shaped metallic casings whose large open ends are hermetically attached to opposite ends of said cylindrical casing and whose smaller ends form inlet and outlet conduits for exhaust gases from an internal combustion engine; and D. plural means within said cylindrical casing adjacent first and second ends thereof for supporting said core member therein so as to compensate for the differences in temperature coefficients of thermal expansion of the material of said core member and said metallic casings when exhaust gases flow through said converter, each said means including a laminated bimetallic annulus comprising a pair of parts having dissimilar temperature coefficients of thermal expansion and fastened to the inner surface of said cylindrical casing adjacent each respectively associated end of said casing so as to maintain compressive forces to outer annular portions of the planar ends of said core member regardless of the temperatures of such core member and said casings, whereby said core member is substantially maintained in its initial position within said cylindrical casing without intolerable shaking about therein.

5. A catalytic converter in accordance with claim 4 and in which said annular space provided between said cylindrical casing and said core member is filled with a high temperature resistant, resilient and partly compressed material.

6. A catalytic converter for exhaust gases from an internal combustion engine comprising in combination; a cylindrical honeycomb core member and a cylindrical metal casing concentrically surrounding said core member with an annular space provided between the outer periphery of said member and the inner peripheral surface of said casing, means for supporting said core member within said casing, said means comprising, in combination;

A. first and second flat rings having outer peripheries corresponding to said inner peripheral surface of said casing and disposed therein adjacent to first and second ends thereof and in a snug but axially slidable relationship therewith, a first flat surface of each of said first and second rings in firm contact with outer annular areas of first and second planar ends, respectively, of said core member;

B. a resilient annulus attached to said first end of said casing, and firmly and resiliently bearing against the second flat surface of said first ring; and C. a dish-like bimetallic laminated annulus, said laminated annulus including;

I. a cylindrical portion attached to said second end of said casing,

II. a convex portion extending from said cylindrical portion radially inwardly towards the center of the annulus and firmly bearing against the second flat surface of said second ring so as to subject at least the region of said core member between said annular areas of said planar ends of said member under a compressive force, and III. said bimetallic laminated annulus including inner and outer layers of metallic materials having dissimilar temperature coefficients of thermal expansion with the material of the outer layer of the laminated annulus having a substantially lower temperature coefficient of thermal expansion than the material of the inner layer of the laminated annulus.

7. A converter in accordance with claim 6 and further including a compressed resilient thermal resistant material in said annular space provided between the outer periphery of said core member and the inner peripheral surface of said casing.

8. A converter in accordance with claim 6 and in which said materials of said laminated annulus are stainless steel materials and said inner layer of such annulus has a temperature coefficient of thermal expansion on the order of about twice that of said outer layer of the annulus.

9. A converter in accordance with claim 8 and further including a compressed resilient thermal resistant material in said annulus space provided between the outer periphery of said core member and the inner peripheral surface of said casing.

* * * * *